Patented May 19, 1953

2,639,273

UNITED STATES PATENT OFFICE 2,639,273

COPOLYMERS OF ALLYL ESTERS OF STABILIZED ROSIN ACIDS

Charles W. Gould, Wilmington, Del., assignor to Hercules Powder Company, Wilmington, Del., a corporation of Delaware No Drawing. Application April 1, 1950, Serial No. 153,496

8 Claims. (Cl. 260—27)

This invention relates to new polymeric materials and, more particularly, to copolymers of allyl esters of stabilized rosin acids.

It is well known that the allyl esters of aliphatic carboxylic acids may be copolymerized with other unsaturates as, for example, vinyl chloride, vinyl acetate, styrene, etc. However, it has not been possible to copolymerize the allyl esters of rosin acids as, for example, allyl abietate, with any of the usual copolymerizable unsaturated monomers.

Now in accordance with this invention, it has been found that allylic esters of stabilized rosin acids may be copolymerized with unsaturated compounds which contain a single ethylenic linkage as the only nonbenzenoid unsaturation to produce new polymeric materials having high molecular weights and valuable properties.

The following examples illustrate the preparation of the copolymers of allylic esters of stabilized rosin acids in accordance with this invention.

Example 1

A glass polymerization vessel was charged with 1.55 parts of pure allyl dehydroabietate, 0.45 part of maleic anhydride, (1:1 monomer ratio) and 0.1 part of benzoyl peroxide. After evacuating the vessel to remove the air and sealing, it was heated until the reactants were in a molten condition. When the reaction mixture was homogeneous, it was heated at 50° C. for 40 hours and then at 80° C. for 48 hours. The copolymer so obtained was a hard resin which was dissolved in methyl ethyl ketone and precipitated by pouring into methanol. The precipitate was filtered, washed with methanol, dried, and reprecipitated. This allyl dehydroabietate-maleic anhydride copolymer had a melting point of 188°–193° C. and was insoluble in hot or cold water or dilute alkali. On analysis it was found to contain about 1.33 moles of the anhydride per mole of resinate.

Example 2

Example 1 was repeated except that the allyl ester of disproportionated rosin was used instead of the pure allyl dehydroabietate. The product obtained in this case had a melting point of 188°–191° C.

Example 3

A glass polymerization vessel was charged with 7.74 parts of hydroabietyl fumarate, 8 parts of the allyl ester of dehydrogenated rosin, and 0.79 part of benzoyl peroxide (2:1 molar ratio of allyl ester to hydroabietyl fumarate). The vessel was evacuated, sealed, and then heated for 146 hours to 65°–68° C. The copolymer so obtained was purified by dissolving in methyl ethyl ketone and precipitated by pouring into methanol, this procedure being repeated three times, after which it was dissolved in benzene and reprecipitated by pouring into acetone, this procedure being repeated three times. The copolymer had a melting point of 130°–136° C. and, on analysis, was found to have a 1:1 ratio of the monomers.

Examples 4–7

Four glass polymerization vessels were charged with the allyl ester of dehydrogenated rosin and styrene in the amounts shown in the table given below. One part of benzoyl peroxide was added to each vessel and the vessel was then cooled, evacuated, and sealed. They were then heated for 144 hours at 65°–68° C. The copolymers so obtained were dissolved in methyl ethyl ketone and then precipitated by pouring into methanol, this procedure being repeated two more times in order to purify the copolymer. The melting points and molecular weights of the product obtained in each case are given in the table below.

| Ex. | Parts of Allyl Ester | Parts of Styrene | Molar Ratio of Styrene: Allyl Ester Used | Copolymer | | |
|---|---|---|---|---|---|---|
| | | | | Melting Point, °C. | Molecular Weight | Molar Ratio of Styrene: Allyl Ester in Copolymer |
| 4 | 15.9 | 4.1 | 1:1 | 87–100 | 1,009 | 5.5:1 |
| 5 | 13.2 | 7.6 | 2:1 | 97–107 | 1,278 | 5.9:1 |
| 6 | 11.2 | 8.8 | 3:1 | 98–104 | 1,227 | 8.8:1 |
| 7 | 9.8 | 10.2 | 4:1 | 103–111 | 1,567 | 13.8:1 |

Example 8

A glass polymerization vessel was charged with 12 parts of an aqueous solution containing 0.5 part of the sodium salt of the sulfate of lauryl alcohol, 0.03 part potassium persulfate, 0.12 part of potassium dihydrogen phosphate, and 1.02 parts of an 0.5 N sodium hydroxide solution. To this solution was added 6.2 parts of the allyl ester of dehydrogenated rosin, 0.05 part of dodecyl mercaptan, and 3.80 parts of styrene. The vessel was flushed out with nitrogen, closed, and heated at 40° C. with agitation for 90 hours. The contents of the vessel were coagulated by the addition of 50 parts of a saturated salt solution, followed by 250 parts of ethanol. The coagulant was washed and dried and then dissolved in 40 parts of methyl ethyl ketone. This solution was then poured into 300 parts of methanol to precipitate the polymer. The polymer was redissolved and reprecipitated and finally was obtained as a white powder melting at 110°–112° C. It had a molecular weight of 16,850 and, on analysis, was found to have a molar ratio of styrene to the allyl ester of dehydrogenated rosin of 46.4.

Example 9

A solution of 3.80 parts of styrene, 6.20 parts of the allyl ester of dehydrogenated rosin, and 0.50 part of benzoyl peroxide in 10 parts of benzene was refluxed for 26 hours. At the end of this time the reaction mixture was evaporated to dryness and then dissolved in 16 parts of methyl ethyl ketone. The polymer was precipitated by pouring this solution into 100 parts of methanol. The re-solution and reprecipitation of the polymer were repeated twice. The polymer so obtained was a friable powder melting at 98°–100° C. It had a molecular weight of 1952 and contained a molar ratio of styrene to the allyl ester of 7.0.

Example 10

A glass polymerization vessel was charged with 15 parts of the allyl ester of a completely saturated hydrogenated rosin, 8.98 parts of N-isobornylacrylamide, and 10 parts of a 1% solution of benzoyl peroxide in methanol. The vessel was evacuated, sealed, and then heated at 50° C. for 118 hours. The polymer so obtained was isolated by dissolving the reaction mixture in benzene and precipitating the polymer by pouring the solution into ethanol. The polymer so obtained contained 4.85% combined nitrogen which was equivalent to 28% combined allyl ester in the copolymer. The polymer had a 1% specific viscosity in benzene of 0.214 and a drop softening point of 218° C.

Example 11

A glass polymerization vessel was charged with 20 parts of the allyl ester of a completely hydrogenated rosin, 5.7 parts of maleic anhydride, and 0.26 part of benzoyl peroxide. The vessel was evacuated, sealed, and then heated for 118 hours at 50° C. The polymer so obtained was isolated by dissolving the reaction mixture in benzene and then pouring the solution into ethanol. This copolymer was clear, hard, and brittle, had an acid number of 146, and a 1% specific viscosity in benzene of 0.049.

Example 12

A glass polymerization vessel was charged with 20 parts of the allyl ester of completely hydrogenated rosin, 4.98 parts of vinyl acetate, and 0.25 part of benzoyl peroxide. The vessel was evacuated, sealed, and heated for 118 hours at 50° C. The copolymer was isolated by dissolving the reaction mixture in benzene and then pouring the solution into ethanol to precipitate the polymer. The soft, clear polymer so obtained had a 1% specific viscosity in benzene of 0.074 and a drop softening point of 71° C. The drastic saponification number was 228.5 which was equivalent to 86% allyl ester in the copolymer.

The new copolymers of this invention may be prepared by the copolymerization of an allylic ester of a stabilized rosin acid with an ethylenically unsaturated compound. The allylic esters of the stabilized rosin acids which may be used for the preparation of the copolymers in accordance with this invention are the allyl or methallyl esters of stabilized rosin acids. By the term "stabilized rosin acid" is meant those rosin acids having the hydrocarbon nucleus of dehydroabietic acid, dihydroabietic acid, tetrahydroabietic acid, or the corresponding pimaric acid derivatives. Instead of using the pure stabilized rosin acids, the esters prepared from commercial stabilized rosins may be used as, for example, the allyl or methallyl ester of dehydrogenated or disproportionated rosin, partially hydrogenated rosin, or completely hydrogenated rosin, etc.

The allyl esters of the stabilized rosin acids may be prepared by esterification of the acid with allyl alcohol in the presence of an acid catalyst such as p-toluenesulfonic acid, the reaction being carried out in a manner such that the water is removed from the reaction zone as it is formed. The allyl and methallyl esters may also be prepared by reaction of the allyl or methallyl halides with an alkali metal salt of the stabilized rosin acid.

The compounds which may be copolymerized with the allylic esters of stabilized rosin acids are those unsaturated compounds which contain an ethylenic linkage as the only nonbenzenoid carbon to carbon unsaturation. Compounds containing such unsaturation are the vinyl aromatic compounds, acrylic or methacrylic compounds, $\alpha,\beta$-unsaturated dicarboxylic acid derivatives, vinyl esters and vinyl ethers. Exemplary of vinyl aromatic compounds which may be used are styrene, halostyrenes such as mono- and dichlorostyrene, fluorostyrene, etc., and alkyl styrenes such as $\alpha$-methylstyrene, $\alpha,p$-dimethylstyrene, p-methylstyrene, ethylstyrene, diethylstyrene, etc. The acrylic or methacrylic compound may be any ester as, for example, methyl acrylate, ethyl acrylate, etc., the nitrile, i. e., acrylonitrile or methacrylonitrile, or amide as, for example, acrylamide, methacrylamide, and the N-substituted amides such as N-methylacrylamide, N-ethylacrylamide, N-isobornylacrylamide, etc. $\alpha,\beta$-Unsaturated dicarboxylic acid derivatives which may be used are the anhydrides such as maleic anhydride, and esters such as methyl maleate, ethyl maleate, hydroabietyl maleate, etc. and the corresponding esters of fumaric acid. Other ethylenically unsaturated compounds which may be used are the vinyl esters such as vinyl acetate, vinyl ethers, etc., or any other compound containing a vinyl, vinylidene, or vinylene group. If desired, a mixture of these ethylenically unsaturated compounds may be copolymerized with the allylic esters of the stabilized rosin acids.

The copolymerization of the allylic esters of stabilized rosin acids and the ethylenically unsaturated compounds may be carried out by a homogeneous copolymerization; i. e., a bulk or solution copolymerization process, or by an emulsion copolymerization process. The homogeneous polymerization may be carried out under the conditions well known in the art for this type of copolymerization. Thus, the monomers may be simply mixed with the catalyst and heated sufficiently to form a homogeneous liquid mixture or they may be dissolved in an inert organic solvent and then polymerized. Solvents which may be used for the latter process are benzene, toluene, xylene, hexane, etc. The emulsion polymerization may be carried out by any of the usual emulsion polymerization processes employing fatty acids, resin acids, or the sodium salts of sulfates of the higher molecular weight alcohols as the emulsifying agent.

The copolymerization of these monomers may be catalyzed by means of any peroxidic catalyst as, for example, potassium persulfate, organic peroxides such as the tertiary alkyl peroxides, acyl peroxides such as acetyl peroxide, benzoyl peroxide, etc. The amount of the peroxidic catalyst which may be used to bring about the copolymerization reaction will depend upon the type and purity of the monomers. In general, an amount of from about 0.5 to about 5% monomer weight may be used. In the case of the copolymerization of a maleic-type unsaturate with the allyl resinates, the amount of peroxide catalyst will preferably be from about 1 to about 2% of the weight of the monomers. In the case of the copolymerization of a styrene with the allyl resinates, the peroxide catalyst will preferably be used in an amount of about 3 to 5% if the monomer ratio is from about 1:4 to about 2:1 or from about 0.5 to about 2% if the monomer ratio is above 2:1.

Various activators and combinations of activators may be added to these peroxide catalyzed polymerization processes in order to accelerate the reaction. Activators which may be used are the basic nitrogen compounds such as ammonia, amines, hydrazines, etc., complexes of heavy metal salts as, for example, iron, cobalt, nickel, copper, manganese, etc. salt complexes, and the combination of activators known as the redox systems. The type of activator used will, of course, depend upon whether a homogeneous or emulsion-type of polymerization is employed. For homogeneous polymerization, the activators must be soluble in the system and thus the amine, hydrazine, etc. must be soluble in the monomers or the inert solvent if the latter is used. In the same way, the heavy metal compound must be organic soluble and for this purpose the heavy metal acetylacetonates, such as iron acetylacetonate, are particularly useful. If a redox system is used in the homogeneous polymerization, an organic-soluble heavy metal salt such as iron resinate, acetate, naphthenate, etc., is used in combination with an organic-soluble reducing agent such as an α-hydroxycarbonyl compound. Exemplary of the α-hydroxycarbonyl compounds which may be used in the redox homogeneous polymerization are acetylacetone, acetoin, benzoin, butyroin, etc. For emulsion polymerization, the activators which are used are generally water soluble. Thus for a redox emulsion system a water-soluble heavy metal salt such as iron, etc., associated with a complex-forming compound such as pyrophosphate, oxalate, citrate, tartrate, or salicylate is used. Reducing agents which are water soluble are also most useful and those most commonly employed are the reducing sugars such as glucose, fructose, lactose, sorbose, etc., but such compounds as acetylacetone, benzoin, etc., may also be used.

The temperature at which the copolymerization reaction is carried out will depend upon the type of copolymerization process used, the catalyst employed, etc. Usually a temperature of from about 40° C. to about 150° C. is used and preferably from about 50° C. to 90° C. When the copolymerization is carried out by a homogeneous process, the temperature will preferably be from about 50° C. to about 150° C. and when the process is carried out by an emulsion polymerization, the temperature will preferably be from about 40° C. to about 90° C.

As may be seen from the foregoing examples, the ratio of the ethylenically unsaturated monomer to the allylic ester of the stabilized rosin acids may be varied over a wide range in the preparation of the copolymers in accordance with this invention. The monomer ratio employed in the copolymerization process will depend upon the ethylene unsaturate used and the type of product desired. For example, the softening point, solubility and compatibility with other materials may be varied by varying the ratio of the monomers in the copolymers. In general, the ratio of ethylene unsaturate to allylic ester may vary from 1:8 to 4:1 and preferably will be within the range of 1:4 to 2:1. When the ethylenically unsaturated monomer is of the maleic or fumaric type, the ratio of this unsaturate to the allyl ester is preferably from about 1:3 to 3:1 and when the unsaturate is of the type of styrene, the monomer ratio will preferably be within the range of 1:4 to 2:1.

The copolymers of the allyl and methallyl esters of stabilized rosin acids with the ethylenically unsaturated compounds have high molecular weights and melting points, low acid and hydroxyl values, and excellent solubility characteristics. They are particularly useful as varnish resins, lacquer resins, adhesive modifiers, printing ink and floor tile resins, and as plasticizers for various applications.

What I claim and desire to protect by Letters Patent is:

1. The process of copolymerizing an allylic ester of a stabilized rosin acid with an unsaturated compound containing a single ethylenic linkage as the only nonbenzenoid carbon to carbon unsaturation which comprises heating a mixture of the two monomers in the presence of a peroxidic polymerization catalyst.

2. The process of copolymerizing allyl dehydroabietate with an unsaturated compound containing a single ethylenic linkage as the only nonbenzenoid carbon to carbon unsaturation which comprises heating a mixture of the two monomers in the presence of a peroxidic polymerization catalyst.

3. The process of copolymerizing allyl hydroabietate with an unsaturated compound containing a single ethylenic linkage as the only nonbenzenoid carbon to carbon unsaturation which comprises heating a mixture of the two monomers in the presence of a peroxidic polymerization catalyst.

4. The process of copolymerizing allyl dehydroabietate with styrene which comprises heating a mixture of the two monomers in the presence of a peroxidic polymerization catalyst.

5. The process of copolymerizing allyl dehydroabietate with maleic anhydride which comprises heating a mixture of the two monomers in the presence of a peroxidic polymerization catalyst.

6. The process of copolymerizing allyl dehydroabietate with hydroabietyl fumarate which comprises heating a mixture of the two monomers in the presence of a peroxidic polymerization catalyst.

7. The process of copolymerizing allyl hydroabietate with maleic anhydride which comprises heating a mixture of the two monomers in the presence of a peroxidic polymerization catalyst.

8. The process of copolymerizing allyl hydroabietate with vinyl acetate which comprises heating a mixture of the two monomers in the presence of a peroxidic polymerization catalyst.

CHARLES W. GOULD.

References Cited in the file of this patent

UNITED STATES PATENTS

| Number | Name | Date |
|---|---|---|
| 2,479,516 | Rust et al. | Aug. 16, 1949 |

OTHER REFERENCES

Von Fischer: "Paint and Varnish Technology," New York, 1948, pages 108 and 109. Copy in Div. 50.